(12) United States Patent
Pecone et al.

(10) Patent No.: US 6,263,391 B1
(45) Date of Patent: *Jul. 17, 2001

(54) MODULAR BUS BRIDGE

(75) Inventors: Victor Key Pecone, Lyons; Dwayne Howard Swanson, Westminster; John M. Hartling, Longmont, all of CO (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,123

(22) Filed: Sep. 24, 1998

(51) Int. Cl.[7] ............................. G06F 13/00; G06F 13/38
(52) U.S. Cl. .......................... 710/129; 710/100; 710/101; 710/102; 710/103; 710/126; 710/128; 711/4; 711/112; 345/501; 345/503; 345/514; 345/520; 345/521; 361/393; 361/681; 361/683
(58) Field of Search ....................................... 710/129, 100, 710/102, 103, 176, 101, 128; 711/4, 112; 345/501, 521, 520, 514, 503; 360/69; 361/686, 685, 393, 681, 683

(56) References Cited

U.S. PATENT DOCUMENTS

| | | | |
|---|---|---|---|
| 5,113,500 | * | 5/1992 | Talbott et al. ....................... 710/129 |
| 5,196,993 | * | 3/1993 | Herron et al. ....................... 361/393 |
| 5,611,057 | * | 3/1997 | Pecone et al. ....................... 710/102 |
| 5,628,637 | * | 5/1997 | Pecone et al. ......................... 439/74 |
| 5,640,541 | * | 6/1997 | Bartram et al. ...................... 395/500 |
| 5,678,011 | * | 10/1997 | Kimm et al. ........................ 710/102 |
| 5,758,103 | * | 5/1998 | Oh ..................................... 710/103 |
| 5,761,443 | * | 6/1998 | Kranich .............................. 710/100 |
| 5,796,576 | * | 8/1998 | Kim .................................... 361/681 |
| 5,805,415 | * | 9/1998 | Tran et al. ........................... 361/681 |
| 5,815,735 | * | 9/1998 | Baker .................................. 710/72 |
| 5,822,551 | * | 10/1998 | Crane, Jr. et al. .................. 710/127 |
| 5,835,344 | * | 11/1998 | Alexander ........................... 361/683 |
| 5,935,226 | * | 8/1999 | Klein .................................. 710/101 |
| 5,938,751 | * | 8/1999 | Tavallaei et al. ................... 710/103 |
| 6,003,100 | * | 12/1999 | Lee ..................................... 710/102 |

OTHER PUBLICATIONS

IBM Technical Disclosure Bulletin; title: Personal Computer Mobile Work Station; pp. 3488–3489, Nov. 1984.*

* cited by examiner

Primary Examiner—Ayaz Sheikh
Assistant Examiner—Frantz B. Jean
(74) Attorney, Agent, or Firm—Patton Boggs LLP

(57) ABSTRACT

The invention is a modular bus bridge that comprises an I/O controller board, an optional display, and various connectors. The connectors allow a choice of backplane mounting or cable connections. The I/O controller board interconnects bus interfaces and controls the display. The I/O controller board is connected to the display by releasable connectors, so the display may be optionally added or removed. The display allows an end-user to scroll through a menu presented on the display and select from the menu. The I/O controller board is coupled to a backplane connector for backplane mounting. A cable interface can be releasably connected to the backplane connector if cable connections are desired instead of backplane mounting.

23 Claims, 3 Drawing Sheets

MODULAR BUS BRIDGE

BACKGROUND OF THE INVENTION

1. Field of the Invention

The invention is related to the field of computer systems, and in particular, to a modular bus bridge that can be readily converted from one version to another.

2. Statement of the Problem

Computer system block diagrams typically show a central processor unit (CPU) and an Input/Output (I/O) subsystem which includes peripheral devices such as disk drives, tape drives, and printers. For high-performance data transfers, I/O subsystem controllers physically interface to the CPU through one of several different internal bus architectures. The I/O controller normally plugs into the CPU bus and then cables to the actual peripheral devices through yet another bus called the peripheral bus. Popular peripheral bus interfaces include the Small Computer System Interface (SCSI) and Fiber Channel (FC). SCSI and FC protocols are specified by ANSI standards X3T9.2 and X3T9.3, respectively.

Conceptually, the SCSI I/O controller serves as a "bridge" between the CPU bus and the peripherals' SCSI bus in that it does wire transport layer conversions from the CPU bus to SCSI and also takes care of any software protocol translations and data buffering. The SCSI controller can also further fan out to multiple peripheral busses since the data bandwidth capabilities of the CPU bus significantly exceed that of the peripheral buses. The peripheral SCSI bus connects directly to the peripheral device (for example, a disk drive) within the CPU cabinet or it can be cabled remotely to another cabinet that contains the peripheral devices. When this remote bus interface leaves the CPU cabinet, it is then called the Host channel. Within the remote external cabinet a comparable bridge can be used to convert the host channel to fan out to additional peripheral busses, called Device channels. Thus, a bridge can be a one-to-many control device, for example, one SCSI Host channel to two SCSI Device channels, referred to as a "1×2 bridge".

Within the external cabinet the bridge can be designed as a single board (Motherboard) that plugs into a local backplane. All interfaces into the bridge including the Host and Device channels, and other supporting buses for management interfaces, for example RS-232, have to be accommodated in the design of the backplane. The backplane also needs to accommodate an interface to any visual displays through yet another interface. Design of the back plane and associated cabinetry are problematic and typically delay implementation of new bridges.

An alternative packaging scheme is to design the bridge in such a way that in addition to plugging directly to a backplane, it can also occupy an existing peripheral device slot (for example, 5.25 inch disk drive), in which case the Host and Device channels, and the management interfaces are cabled directly to the bridge. A simple I/O patch panel and display panel can also be designed that attach directly to the bridge.

Since current bridge products offer flexible host interfaces, the I/O patch panel could be designed to accommodate several different host channel technologies (for example, SCSI or FC) and the user selects the configuration merely by changing the cabling scheme; there is no need to change backplanes. This makes the customization and conversion effort between interfaces and bridge versions virtually transparent, and benefits the end-user in reduced implementation schedules, field upgrades, and re-installations. Resellers would benefit because they could easily modify the external bridge to fit end-users varied demands. Similarly, the display panel could be removed and easily replaced with a blank enclosure panel or just left off.

SUMMARY OF THE SOLUTION

The invention solves the above problems with a modular bus bridge that can be bought or sold in multiple versions and readily converted from one configuration to another. The modular bus bridge allows end-users to easily upgrade or re-install the bus bridge, and allows the resellers to tailor in the bus bridge to meet the specific end-user demand for each particular version.

The bus bridge includes an I/O bridge controller board which has all the logic for changing the physical bus interfaces between the Host channel and the Device channels and supports the Display interface. The controller provides a monolithic connector which presents all the signals for all external buses; including channels, display logic, and other physical interfaces. This connector attaches directly to the backplane in one configuration. A second connector is used for physically attaching to a display panel. Thus, the controller is designed to plug directly to a backplane or to be configured with a display panel or blank panel, and an I/O patch panel.

The modular bus bridge system then includes the I/O controller, Display panel, blank panel, and associated cables to allow implementation in several different configurations. For non-backplane implementations, it also would be designed into a sheet metal enclosure with guide rails allowed to be inserted into a standard 5.25 inch slot or other device form factor slot. The users then have the complete flexibility to determine how to configure a system to meet their needs.

The invention is a modular bus bridge that comprises an I/O controller board, an optional display, and various connectors. The connectors allow a choice of backplane mounting or cable connections. The I/O controller board interconnects bus interfaces and controls the display. The I/O controller board is connected to the display by releasable connectors, so the display may be optionally added or removed. The display allows an end-user to scroll through a menu presented on the display and select operations from the menu. The I/O controller board is coupled to a backplane connector for backplane mounting. A cable interface can be releasably connected to the backplane connector if cable connections are desired instead of backplane mounting.

DETAILED DESCRIPTION OF THE INVENTION

Modular Bus Bridge Components—FIGS. 1–4

Figure 1:
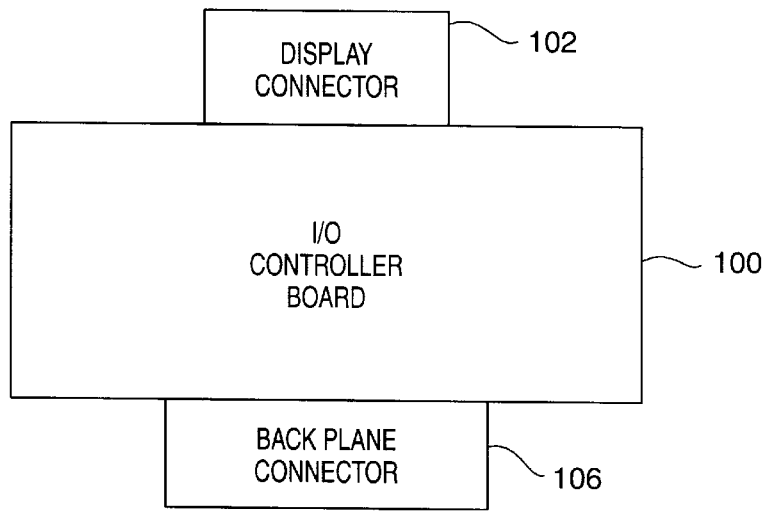
FIG. 1 is a block diagram of modular bus bridge components in an example of the invention.

FIG. 1 depicts components of the modular bus bridge of the present invention. An I/O controller board 100 is coupled to a display connector 102. The I/O controller board 100 is also coupled to a backplane connector 106.

The I/O controller board 100 contains all of the logic to interconnect the bus interface for the Host channel and the bus interfaces for the Device channels. The Host channel and the Device channels are typically SCSI or Fiber Channel. The I/O controller board 100 also provides display control signals, handles software protocol translations, and performs data buffering. I/O controller boards are well-known in the art with examples being models AIC-7132 and AEC-43128 by Adaptec Inc. of Milpitas Calif.

The display connector 102 is a conventional male or female pin and socket type connector. In one version of the invention, the display connector 102 is a male connector with 26 pins. The pins support power, ground, 8-bit data bus, 3-bit control bus, 6-bit LCD control, and menu scroll, and menu selection signals.

The backplane connector 106 is a conventional component that is comprised of a female connector with several pins that fit into the male connections of a backplane. The backplane connector 106 includes all of the external connections for the Host channel, Device channels, power, ground, and configuration.

Figure 2:
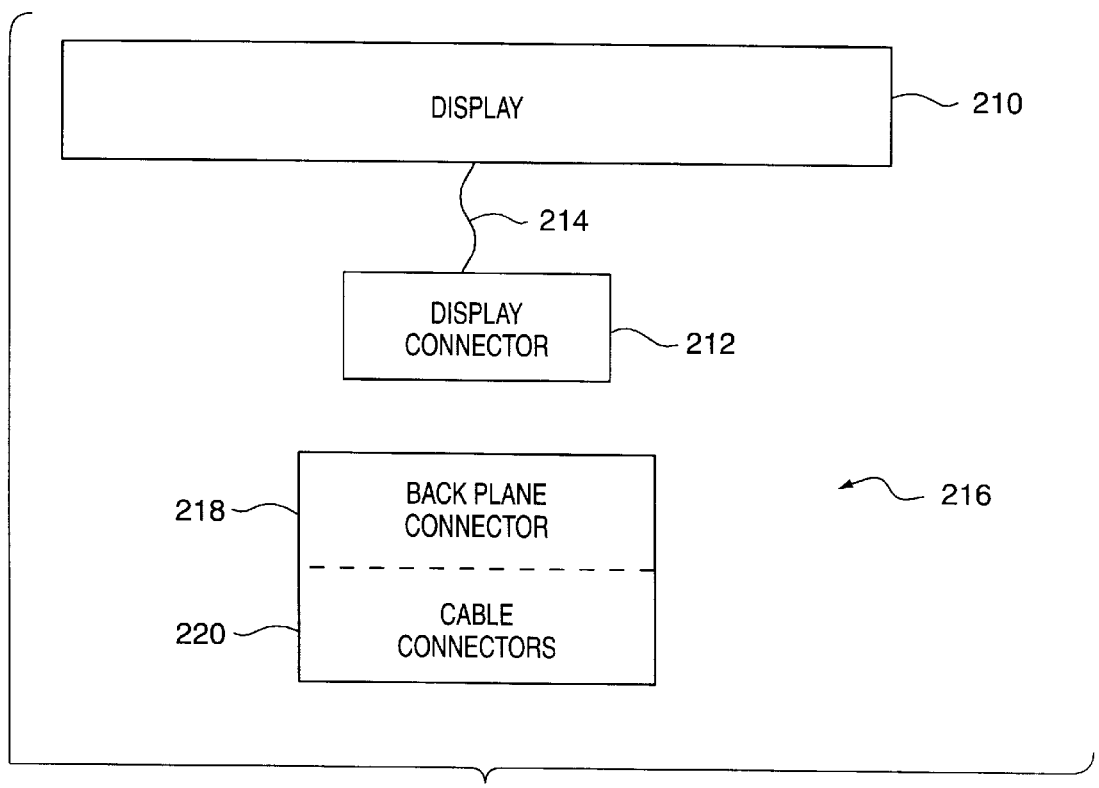
FIG. 2 is a block diagram of modular bus bridge components in an example of the invention.

FIG. 2 depicts additional components for the modular bus bridge. A display 210 is coupled to display connector 212 by a cable 214. The display 210 provides the user with status information and control menus. In one version of the invention, the display 210 includes a Liquid Crystal Display (LCD), indicator lights, and control buttons that allow the user to scroll through a menu and make menu selections. The display 210 also includes circuitry to forward user inputs to the I/O controller board 100 and to drive the LCD based on display control signals from the I/O controller board 100. In alternative embodiments of the invention, the display 210 can be replaced by a blank front plate if the display is not desired.

The display connector 212 is a conventional male or female pin and socket type connector operational for releasable connection to the display connector 102. The display connectors 102 and 212 should be coordinated so one is a male connector and the other is a female connector. In one version of the invention, the display connector 212 is a female connector that accepts 26 pins. The pins support power, ground, 8-bit data bus, 3-bit control bus, 6-bit LCD control, menu scroll, and menu selection signals. The cable 214 is conventional.

A cable interface 216 is also included that is comprised of a backplane connector 218 and cable connector 220. The cable interface 216 allows cable connections to be used when connecting the modular bus bridge to other devices instead of mounting the modular bus bridge onto a backplane. The connections of the backplane connector 106 are mapped through the backplane connector 218 and the cable connector 220 to cables. These connections and cables are typically for a Host channel, Device channels, power, ground, and configuration.

The backplane connector 218 is comprised of a female connector that accepts the pins of the backplane connector 106 to provide for a convenient, secure, and releasable connection. The cable connector 220 is comprised of conventional sockets that accept the pins in the plug at the end of a cable. For example, the cable connector 220 could include SCSI or Fiber Channel sockets for accepting SCSI or Fiber Channel cables. In one version of the invention, the cable connector 220 includes connectors for multiple SCSI cables, battery and power cables, failover jumpers, and a configuration cable.

Figure 3:
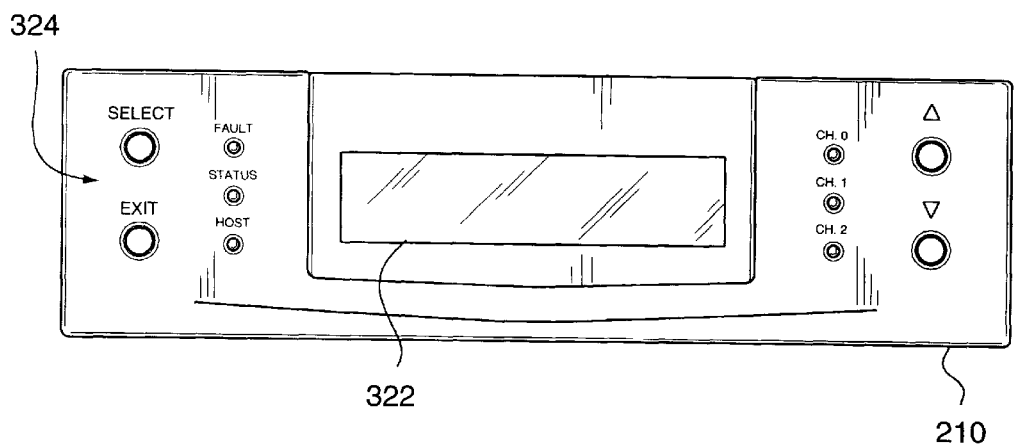
FIG. 3 illustrates the front of the display for the modular bus bridge in an example of the invention.

FIG. 3 depicts the front view of the display 210 in one example of the invention although other configurations would not depart from the scope of the invention. The display 210 includes an LCD 322 and control buttons 324 allowing the user to scroll through menu on the LCD 322 and make menu selections. Bus bridge displays and menus are known in the art.

Figure 4:
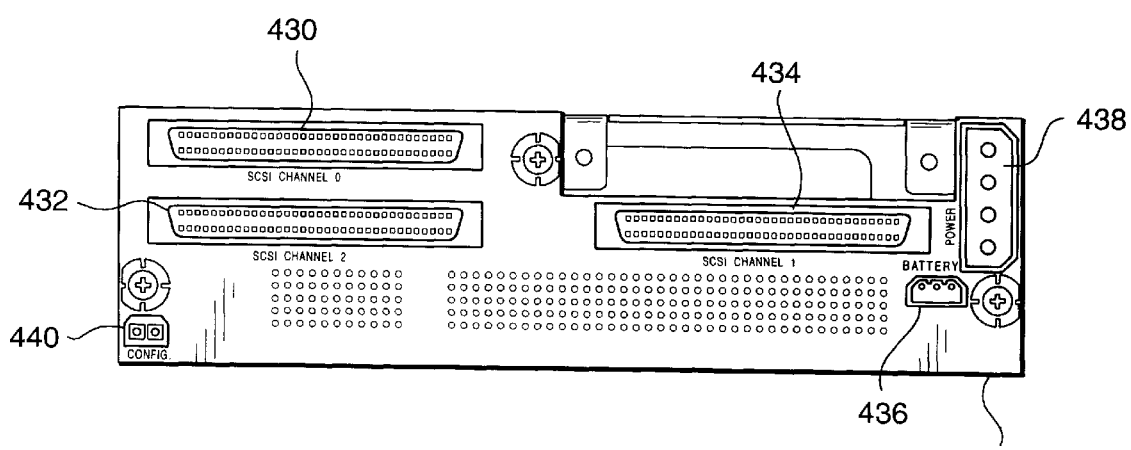
FIG. 4 is a block diagram of the cable connector on the cable interface of the modular bus bridge in an example of the invention.

FIG. 4 depicts the back view of the cable connections 220 in one example of the invention although other configurations would not depart from the scope of the invention. The cable connections 220 include SCSI sockets 430, 432, and 434. SCSI sockets 430 and 432 would typically be used for the Device channels and the socket 434 would be used for the Host channel. Fiber channel could be used instead of SCSI for these connections if desired. Battery connector 436 and power connector 438 are provided to support the operation of the modular bus bridge, including the display 210. A configuration connector 410 is provided to allow the user to configure and control the bus bridge. The configuration connection is typically a conventional serial bus. These connectors and their function are known in the art.

Figure 5:
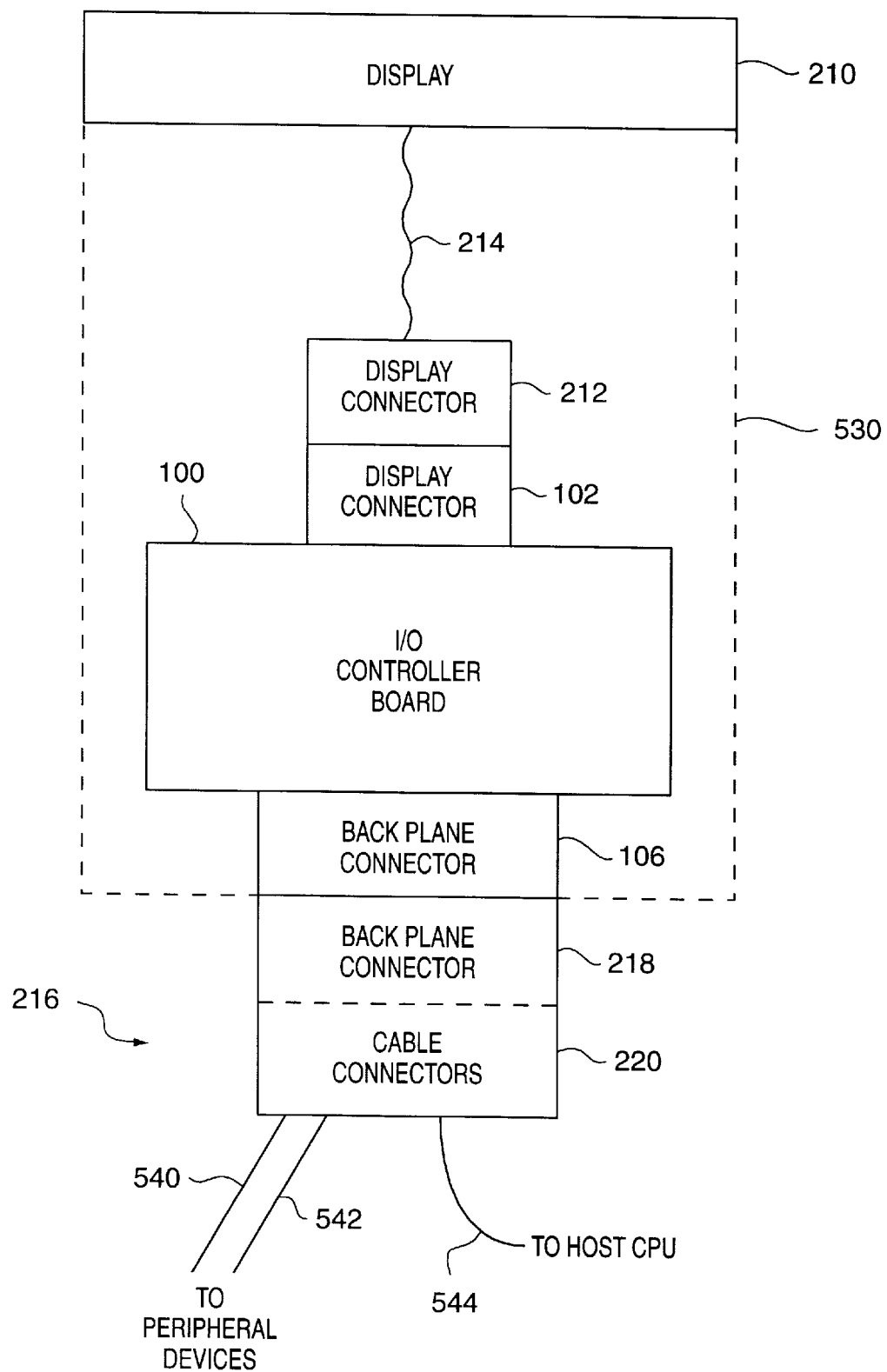
FIG. 5 is a block diagram of modular bus bridge configuration in an example of the invention.

Modular Bus Bridge Configuration—FIG. 5

FIG. 5 depicts the above described components interconnected to form a version of the modular bus bridge. The I/O controller board 100 is connected to the display 210 by interconnecting the display connector 102 and the display connector 212. The I/O controller board 100 is able to display status information to the end-user on the display 210. The I/O controller board 100 also receives menu selections input through display 210 by the end-user.

The I/O controller board 100 is connected to the cable interface 216 by plugging the backplane connector 218 into the backplane connector 106. Cables 540, 542, and 544 are connected to the cable connector 220. The cables 540 and 542 are remotely connected over the Device channels to peripheral devices, such as disk drives, tape drives, and printers. Cable 544 is remotely connected over the Host channel to the CPU.

An enclosure 530 is also included. The enclosure is typically comprised of sheet metal with guide rails that allow it to be inserted into a standard peripheral device slot, such as a 5.25 inch slot. The enclosure 530 houses the I/O control board 100, display connector 102, cable 104, and backplane connector 106. The display 210 is configured to readily connect to the enclosure 530 which then also houses the display connector 212 and the cable 214. If desired, the enclosure 530 can include a battery and a fan.

The connections between: 1) display connectors 102 and 212; 2) backplane connectors 218 and 220; and 3) cable connector 220 and cables 540, 542, and 544 are "releasable" connections. The term "releasable" means that the connections can be plugged together and unplugged, such as the plug-type connections to a conventional computer that are known in the art. The releasable connections allow for the modular design.

The modular design of the invention should be appreciated from FIG. 5. In some configurations of the invention, the I/O controller board 100 can be simply plugged into a backplane using the backplane connector 106. In this configuration, the cable interface 216 is not needed since all connections are made through the backplane. If desired, the display 210 can be attached in this configuration.

In other configurations of the invention, cabling can be used instead of backplane mounting. The cable interface 216 is connected to the backplane connector 106. The modular bus bridge is now ready to accept cable connections 540, 542, and 544 to the host CPU and peripheral devices. This installation typically includes the metal enclosure 530 that fits into a standard peripheral device slot. If desired, the display 210 can be attached to the metal enclosure 530. Alternatively, a blank front plate can be used on the enclosure 530 instead of the display 210.

The modular bus bridge can be bought or sold in multiple versions and readily converted from one configuration to another. The modular bus bridge allows end-users to easily upgrade or re-install the bus bridge, and allows the resellers to tailor in the bus bridge to meet the specific end-user demand for each particular version.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A modular bus bridge that comprises:
    an Input/Output (I/O) controller board that is operational to interface a plurality of bus interfaces and to generate bus bridge display control signals;
    a first display connector that is coupled to the I/O controller board and configured to provide a releasable connection with a bus bridge display; and
    a first backplane connector that is coupled to the I/O controller board and operational for connection to a backplane.

2. The bus bridge of claim 1 wherein at least one of the bus interfaces is Small Computer System Interface.

3. The bus bridge of claim 1 wherein at least one of the bus interfaces is a Fiber Channel.

4. The bus bridge of claim 1 wherein at least a portion of the first backplane connector is for host processor connections.

5. The bus bridge of claim 1 wherein at least a portion of the first backplane connector is for peripheral device connections.

6. The bus bridge of claim 1 wherein at least a portion of the first backplane connector is for Small Computer System Interface connections.

7. The bus bridge of claim 1 wherein at least a portion of the first backplane connector is for Fiber Channel connections.

8. The bus bridge of claim 1 wherein at least a portion of the first backplane connector is for power connections.

9. The bus bridge of claim 1 wherein at least a portion of the first backplane connector is for configuration connections.

10. The bus bridge of claim 1 further comprising an enclosure.

11. The bus bridge of claim 1 further comprising the bus bridge display that is coupled to a second display connector and that is operational to display bus bridge information in response to the bus bridge display control signals, wherein the first display connector is releasably connected to the second display connector.

12. The bus bridge of claim 11 wherein the bus bridge display includes a Liquid Crystal Display (LCD).

13. The bus bridge of claim 11 wherein the bus bridge display is operational to allow an end-user to scroll through a menu presented on the bus bridge display and select from the menu.

14. The bus bridge of claim 11 wherein the bus bridge display is connected to the second display connector by a second cable.

15. The bus bridge of claim 11 wherein the first and second display connectors have connections for display control, menu scroll, and menu selection signals.

16. The bus bridge of claim 11 wherein the bus bridge display is operational to collect user inputs and forward the inputs to the I/O controller board.

17. The bus bridge of claim 1 further comprising a cable interface comprised of a second backplane connector coupled to a cable connector, wherein the second backplane connector is connected to the first backplane connector and the cable connector is operational for connection to a plurality of cables.

18. The bus bridge of claim 17 wherein the cable connector is operational to accept a cable from a host processor.

19. The bus bridge of claim 17 wherein the cable connector is operational to accept a cable from a peripheral device.

20. The bus bridge of claim 17 wherein the cable connector is operational to accept a Small Computer System Interface cable.

21. The bus bridge of claim 17 wherein the cable connector is operational to accept a Fiber Channel cable.

22. The bus bridge of claim 17 wherein the cable connector is operational to accept a power cable.

23. The bus bridge of claim 17 wherein the cable connector is operational to accept a configuration cable.

* * * * *